(No Model.)

W. A. PELTON.
PLANT HOLDER.

No. 542,942. Patented July 16, 1895.

Witnesses
C. C. Burdine.
G. A. Pennington.

Inventor
William A. Pelton
By L. S. Bacon
Attorney ent by means of air-pressure, there is further
UNITED STATES PATENT OFFICE.

WILLIAM A. PELTON, OF MERIDEN, CONNECTICUT.

PLANT-HOLDER.

SPECIFICATION forming part of Letters Patent No. 542,942, dated July 16, 1895.

Application filed April 3, 1895. Serial No. 544,295. (No model.)

*To all whom it may concern:*

Be it known that I, WILLIAM A. PELTON, a citizen of the United States, residing at Meriden, in the county of New Haven and State of Connecticut, have invented certain new and useful Improvements in Plant-Holders; and I do hereby declare the following to be a full, clear, and exact description of the invention, such as will enable others skilled in the art to which it appertains to make and use the same.

This invention relates to an improvement in plant-holders; and it consists in the construction and arrangement of parts hereinafter described, and definitely pointed out in the claims.

The aim and purpose of the invention is the provision of an improved receptacle adapted more especially for holding plants, such as ferns, and the particular object is to so fashion the removable rim that a porcelain pot or inner vessel may be used and all contact between the earth and moss contained in the inner vessel and the sides of the outer vessel be prevented, and, further, so to construct the rim that the same may be made solid and yet receive the pot, which latter may be readily removed from the rim at will when refilling or cleaning is necessary or when it is wished to moisten or water the plant.

In the prior state of the art it has been customary to spin the rim directly onto the flange of the pot by forming projections above and below the flange of the pot. It has also been suggested to form the rim in sections, so that the same could be clamped around the edge of the pot. In both the former cases great trouble and annoyance is had from the fact that the earth and moisture enters between the rim and pot at their points of contact and becomes secreted in the pockets or cavities, thereby destroying the finish of the metal, eventually eating into the metal itself and giving it an ugly and unsightly appearance as well as destroying the strength of the metal. Fern dishes have also been made without the porcelain lining or pot, but the deteriorating effect of the earth and its fertilizer soon destroys the appearance of the vessel.

With the present construction the above defects are wholly overcome, and the pot may be quickly removed from the outer vessel and rim, which latter can be kept in a perfect condition, free from all dirt or moisture at the sides or visible points.

The objects of the invention are attained by the construction illustrated in the accompanying drawings, wherein like letters of reference designate corresponding parts in the several views, and in which—

Figure 1:
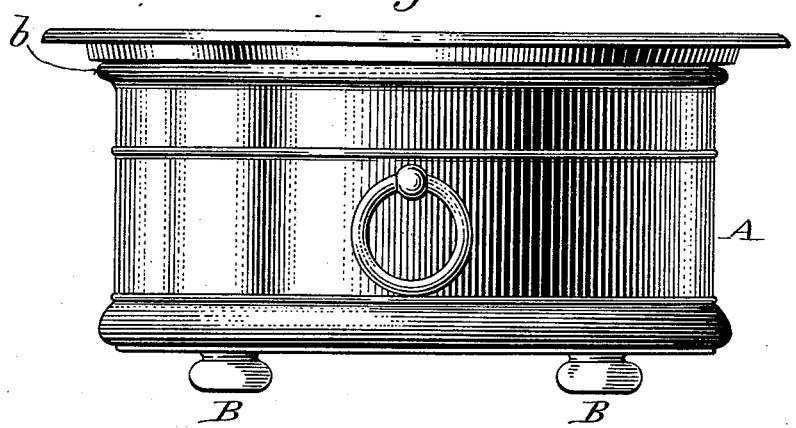
Figure 2:
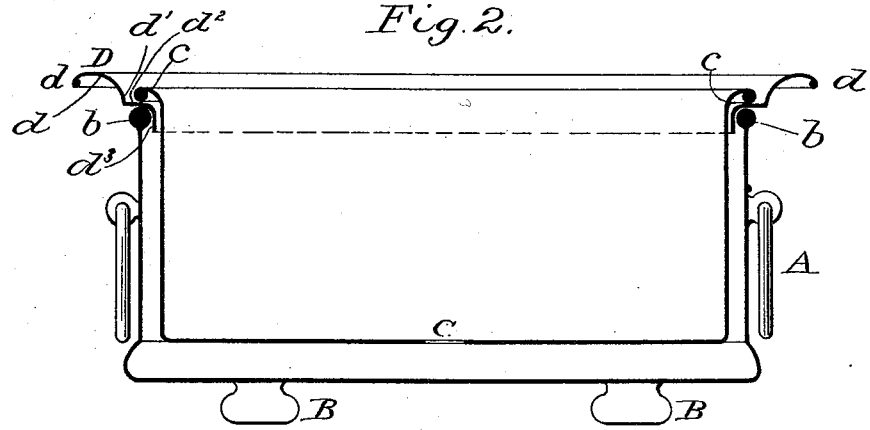
Figure 3:
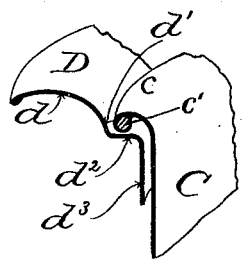

Figure 1 is an elevation of the device. Fig. 2 is a longitudinal vertical section taken through the center, and Fig. 3 is a detail view of a section of the rim and upper edge of the pot.

In the drawings, A designates the outer vessel, constructed of metal and usually of fanciful design; B, the feet. The sides of the vessel are preferably perpendicular and terminate in a bead $b$, circular in cross-section and projecting beyond the sides in opposite directions.

C designates the pot or inner vessel having perpendicular sides and of uniform dimensions and of a depth less than that of the outer vessel. This pot is formed with an outwardly-extending marginal flange $c$ with a downwardly-extending outer edge at $c'$. The pot has the usual central perforation in its bottom.

D designates the supporting-rim, which is constructed of a single piece of metal having a fanciful outwardly-extending handling-flange $d$, terminating inwardly in the vertical wall $d'$. This is bent at right angles at its lower end to form the seating-flange $d^2$, which is curved at its inner end and from thence bent down vertically to form the side flange $d^3$. The diameter of the rim at the curved portion of the flange $d^2$ is slightly less than the interior diameter of the bead on the upper edge of the outer vessel, on and against the round surface of which the same rests, so that a close joint is formed between the vessel and rim and all lateral movement of the latter is prevented. On the flange $d^2$ is seated the flange of the pot, the contact being only with the inclined outer portion $c'$, so that the surface-contact is greatly reduced. The diameter of the ring at the flange $d^3$ is substantially that of the outer diameter of the pot, and thereby it closely hugs the same and prevents lateral movement of the pot, and, owing to the inwardly-projecting portion of the bead on the vessel, the flange $d^3$ is prevented from coming in contact therewith. All moisture is thus prevented from reaching the fanciful metal sides of the outer vessel.

In practice it is only necessary to insert the pot through the rim, which latter has previously been placed on the vessel. When it is desired to remove the pot the same is lifted out by lifting the ring. The ring is then slipped from the pot and replaced on the vessel. It will be noticed that in this construction no grooves, cavities, or channels are formed in the rim in which the earth can collect and occasion the destruction of the finish of the outer face of the metal by the salts and other corrosive substances eating into it. Again, there is no necessity of removing pintles or fastenings, as is necessary when the rim is a divided member.

I am aware of Patent No. 525,644, granted to S. W. Babbitt on September 4, 1895, and the invention is in its nature an improvement thereon and on the known form of permanently-attached rims.

Having thus described the invention, what is claimed as new, and desired to be secured by Letters Patent, is—

1. A plant holder comprising an outer vessel, an inner vessel of a depth less than the depth of the outer vessel and having an outwardly extending marginal flange, and a single piece detachable rim comprising a flange projecting beyond the outer vessel, a single horizontal seating flange below and forming an extension or continuation of the other flange resting on the upper edge of the outer vessel and on which the flange on the inner vessel rests, and a depending flange on the horizontal flange, substantially as described.

2. A plant holder comprising an outer vessel having a beaded upper edge, a single piece detached rim comprising the outwardly extending flange $d$, the vertical portion $d'$ the inwardly extending horizontal flange $d^2$ at the lower edge of the vertical portion having a curved inner edge fitting on the bead, a depending flange $d^3$ and a pot having a marginal flange resting on the seating flange $d^2$, substantially as described.

3. In a plant holder, the combination with an outer vessel, of an inner vessel of uniform diameter having a marginal flange at its top, a single piece detached rim having a seating flange resting directly on the outer vessel, and on which the flange of the inner vessel rests, and an outwardly projecting flange above the seating flange projecting beyond the outer vessel, substantially as described.

In testimony whereof I affix my signature in presence of two witnesses.

WILLIAM A. PELTON.

Witnesses:
 JOHN LAWRENCE,
 STEPHEN C. PORTER.